Figure 1:
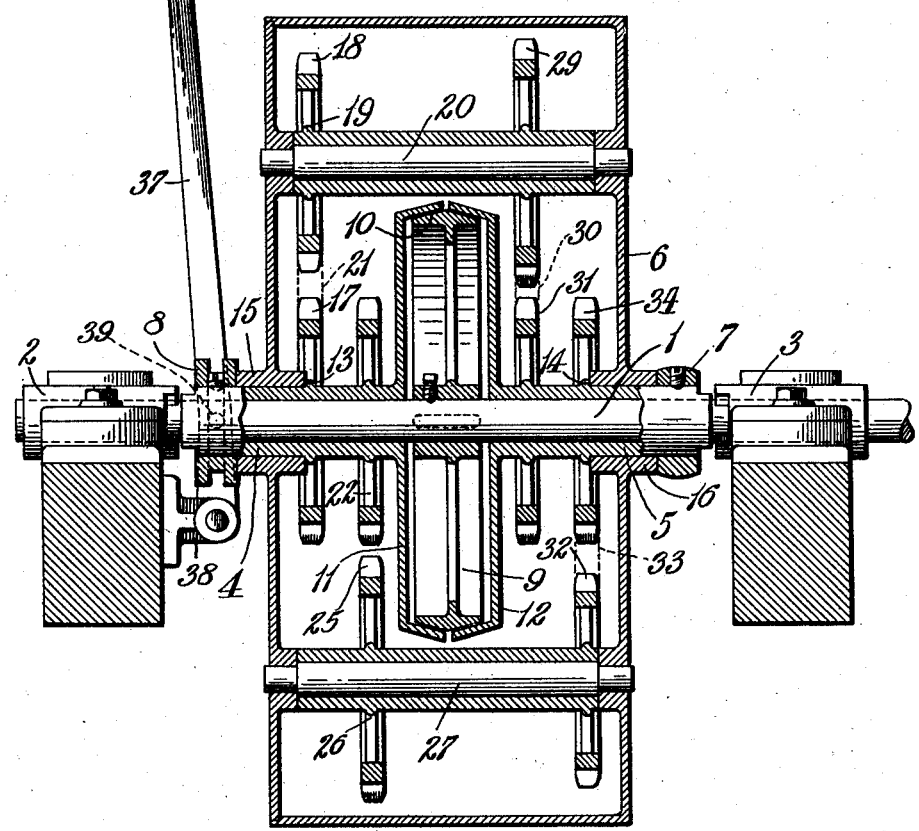

H. DEVLIN.
TRANSMISSION MECHANISM.
APPLICATION FILED FEB. 2, 1912.

1,079,477.

Patented Nov. 25, 1913.

2 SHEETS—SHEET 1.

Witnesses
Chas. W. Stauffiger,
Anna M. Dorr.

Inventor
Henry Devlin,
By
Attorneys

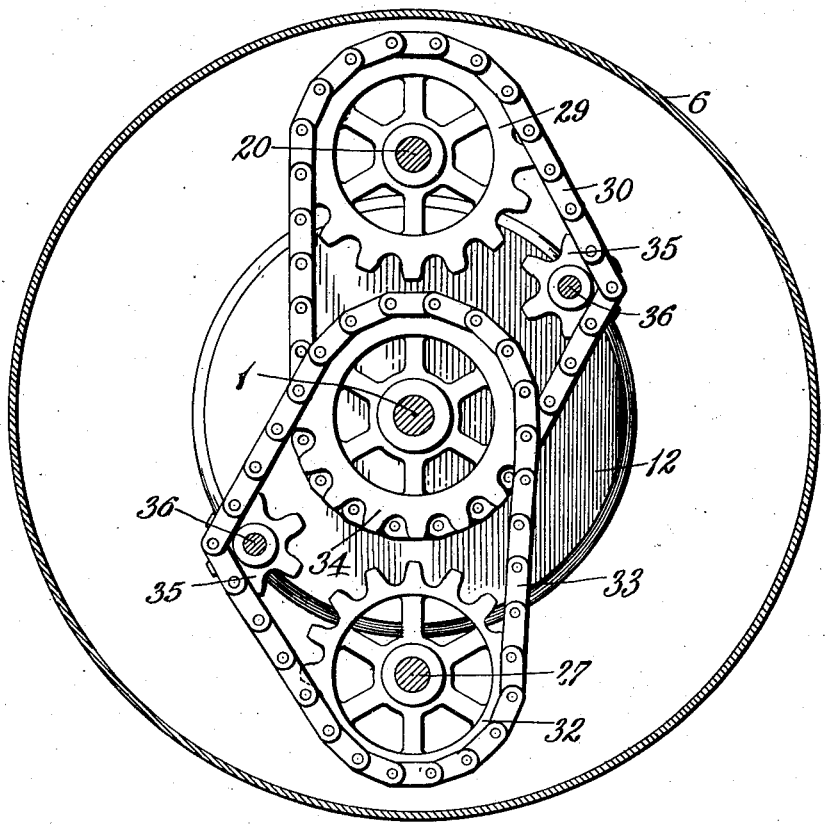

UNITED STATES PATENT OFFICE.

HENRY DEVLIN, OF BAY CITY, MICHIGAN, ASSIGNOR TO THE M. GARLAND COMPANY, OF BAY CITY, MICHIGAN, A CORPORATION OF MICHIGAN.

TRANSMISSION MECHANISM.

1,079,477.  Specification of Letters Patent.  Patented Nov. 25, 1913.

Application filed February 2, 1912. Serial No. 674,877.

*To all whom it may concern:*

Be it known that I, HENRY DEVLIN, a citizen of the United States of America, residing at Bay City, in the county of Bay and State of Michigan, have invented certain new and useful Improvements in Transmission Mechanism, of which the following is a specification, reference being had therein to the accompanying drawings.

This invention relates to speed reduction transmission mechanism for driving a shaft from any source of power at the rate of speed desired together with means for reversing the direction of drive, the mechanism being arranged to be carried by the shaft, the parts being so disposed as to be easy of access for inspection or repair.

In general terms, the mechanism consists of an external rotatable casing adapted to be driven from any source of power and journaled on the shaft to be operated, together with change speed members housed in and carried by the casing and a reverse clutch also within the casing.

The invention consists in the matters hereinafter set forth, and more particularly pointed out in the appended claims.

In the drawings, Figure 1 is a view in section of a mechanism embodying the invention mounted on a shaft; Fig. 2 is a view in side elevation of the mechanism with a plate removed.

Referring to the drawings a shaft 1 is mounted in a pair of suitably disposed fixed bearings 2 and 3 whose end portions are arranged to interlock with the hubs 4 and 5 of sprocket wheels rotatable and longitudinally reciprocable on the shaft. A main driving member in the form of a cylindrical casing 6 is journaled concentrically on the outer portions of the hubs 4 and 5, between a thrust collar 7 secured on the latter hub and a shifting collar 8 on the hub 4. The periphery of the casing is adapted to receive a belt or may be driven by friction or may have gear or sprocket chain teeth as desired.

A friction drum 9 is secured on the shaft 1 between the hubs 4 and 5 and has a double cone driving rim 10 whose oppositely inclined faces are adapted to contact respectively, with the interior peripheral faces of friction spiders 11 and 12 formed on or made fast to the hubs 4 and 5. Thrust shoulders 13 and 14 on the hubs engage the bearing bosses 15 and 16 of the casing so that the movement of the collar 8 toward the friction drum 9 forces the spider 11 into engagement with the rim 10 and a reverse movement carries the shell 12 into similar driving relation to the rim.

The pinion 4 has two parts or members. One member 17 of the sprocket wheel 4 is alined with the member 18 of a planetary pinion 19 that likewise has two parts or members turning on a stud 20 in the casing 6. An endless flexible connection, herein indicated as a sprocket 21, operatively connects the members 17 and 18. A second member 22 of the sprocket wheel 4 is likewise alined with and operatively connected to a member 25 of a planetary pinion 26 mounted on a stud 27 in the casing diametrically opposite the stud 20. A second member 29 of the planetary pinion 19 is coupled as by a suitable flexible connection 30 with a member 31 of the sprocket wheel 5 and a member 32 of the planetary pinion 26 is likewise operatively coupled by a connection 33 with the other member 34 of the sprocket wheel 5. Idlers 35 are journaled in the casing in proper position to take up the slack of the several endless connections and may be provided with any suitable adjusting means whereby the studs 36 on which they are mounted may be shifted in the casing to compensate for wear.

A shifting rod 37 has a forked end embracing the collar 8 and swinging on a pivot plate 38, pins 39 on the lever entering a peripheral groove in the shifting collar.

The parts are so disposed that movement of the lever in one direction as for example, as shown by the arrow, locks the sprocket wheel 4 with the bearing 2 and simultaneously therewith carries the sprocket wheel 5 out of connection with the companion bearing 3. This movement also releases the spider 11 from the drum 9 and throws the latter into engagement with the shell 12 on the sprocket wheel 5. When the casing is rotated while the parts are in this position, the revolution of the planetary pinions 18 and 25 around the shaft 1 drives the planetary pinions in reverse direction to the rotation of the casing and this in turn rotates the sprocket wheel 5 together with the clutch 9 and the shaft. The rate of rotation of the shaft as compared with the casing depends upon the proportionate diameters of the several pinions. Reversal of position of the lever locks the sprocket wheel 5 from rotation and thrusts the sprocket wheel 4 into engagement with the clutch to turn the shaft, thereby driving the latter reversely. Or by proper proportioning of the gears this movement of the lever may cause merely a change in the rate of rotation of the shafts as compared with the casing. The mechanism thus effects both reduction of speed and reversal of direction of the shaft and although it is mounted thereon it is easily accessible for inspection and repair.

The sprocket chains herein illustrated and described may obviously be replaced by belts or gears. One of the planetary pinions may be omitted or additional members may be placed on the sprocket wheels and the number of planetary sprocket wheels correspondingly increased in order to obtain the desired transmission capacity.

Other changes may be made without departing from the scope of the invention and I do not care to limit myself to any particular form or arrangement of parts.

I claim:—

1. Transmission mechanism comprising a shaft, a pair of sprocket wheels independently rotatable and reciprocable longitudinally on the shaft, a driving member rotatable concentrically and longitudinally reciprocable with the sprocket wheels, means for securing one of the wheels from rotating when the latter are shifted in one direction and the other from rotating when shifted in the opposite direction, means adapted to secure either wheel to the shaft when the companion wheel is secured from rotating, planetary sprocket wheels on the driving member provided with members each revoluble around a reciprocable sprocket wheel, and endless flexible connections between said members and companion reciprocable sprocket wheels.

2. Transmission mechanism comprising a shaft, a pair of sprocket wheels independently rotatable and reciprocable longitudinally on the shaft, a driving member rotatable concentrically and longitudinally reciprocable with the sprocket wheels, means for securing one of the wheels from rotating when the latter are shifted in one direction and the other from rotating when they are shifted in the opposite direction, means adapted to secure either wheel to the shaft when the companion wheel is secured from rotating, planetary sprocket wheels on the driving member provided with members each revoluble around a reciprocable sprocket wheel, endless flexible connections between the members of the planetary wheels and the companion sprocket wheels and means for shifting the reciprocable sprocket wheels and driving member on the shaft.

3. Transmission mechanism comprising a shaft, a friction drum secured thereto, a pair of sprocket wheels independently rotatable and reciprocable longitudinally on the shaft on each side of the drum, a driving member rotatable concentrically with the sprocket wheels and drum, means for securing one of the wheels from rotating when the latter are shifted in one direction and the other from rotating when they are shifted in the opposite direction, means adapted to secure either rotatable wheel in engagement with the drum when the companion wheel is secured from rotating, planetary sprocket wheels mounted on the drum and provided with members each revoluble around a reciprocable sprocket wheel, endless flexible connections between each member and the companion reciprocable sprocket wheel, and means for shifting the reciprocable sprocket wheels and driving member.

4. Transmission mechanism, comprising a shaft a pair of bearings, a friction drum secured to the shaft between the bearings, a sprocket wheel rotatable and reciprocable longitudinally of the shaft between each bearing and the drum, provided with a spider adapted to be moved by the shifting thereof into engagement with the drum and with a hub that is adapted to be interlocked with the adjacent bearing when the said wheel is shifted away from the drum, a driving member rotatable on the hubs concentrically with the reciprocable sprocket wheels which it connects to shift together, means for shifting the reciprocable wheels and driving member on the shaft, and planetary sprocket wheels on the driving member revoluble around the reciprocable wheels with a member for the wheels, and endless flexible connections between each member and companion reciprocable wheel.

5. Transmission mechanism comprising a shaft a pair of bearings therefor, a friction drum secured to the shaft between the bearings, a sprocket wheel rotatable and longitudinally reciprocable on the shaft between each bearing and the drum provided with a spider to be moved by the shifting thereof into engagement with the drum and with a hub adapted to be interlocked with the adjacent bearing when the wheel is shifted away from the drum, each sprocket wheel having a pair of members, a driving member rotatable on the hubs concentrically with the reciprocable wheels which it connects to shift together, means for shifting the reciprocable wheels, planetary wheels on the driving member revoluble around the reciprocable wheels each having two members, and endless flexible connections between the members on each planetary wheel and the companion members of the reciprocable wheels whereby the planetary wheels act as intermediate wheels between the reciprocable wheels.

In testimony whereof I affix my signature in presence of two witnesses.

HENRY DEVLIN.

Witnesses:
 HAROLD CATES,
 HARRISON W. GARLAND.

---

Copies of this patent may be obtained for five cents each, by addressing the "Commissioner of Patents, Washington, D. C."